US007170895B2

(12) United States Patent
Wirth et al.

(10) Patent No.: US 7,170,895 B2
(45) Date of Patent: Jan. 30, 2007

(54) SWITCH AND A SWITCHING APPARATUS FOR A COMMUNICATION NETWORK

(75) Inventors: Brian Michael Wirth, Ottawa (CA); Thomas George Zboril, Mississauga (CA); Dan Oprea, Kanata (CA)

(73) Assignee: Tropic Networks Inc., Kanata (CA)

( * ) Notice: Subject to any disclaimer, the term of this patent is extended or adjusted under 35 U.S.C. 154(b) by 982 days.

(21) Appl. No.: 10/108,515

(22) Filed: Mar. 29, 2002

(65) Prior Publication Data

US 2003/0185225 A1   Oct. 2, 2003

(51) Int. Cl.
*H04L 12/28* (2006.01)
*H04Q 11/00* (2006.01)
*G08C 15/00* (2006.01)

(52) U.S. Cl. .................. 370/400; 370/386; 370/217
(58) Field of Classification Search ................ 370/419, 370/217, 219, 220, 386–388, 396, 400
See application file for complete search history.

(56) References Cited

U.S. PATENT DOCUMENTS

| 5,485,453 A | * | 1/1996 | Wahlman et al. ............ 370/389 |
| 5,953,314 A | * | 9/1999 | Ganmukhi et al. ......... 370/220 |
| 6,226,261 B1 | * | 5/2001 | Hurtta et al. ................ 370/219 |
| 2002/0089926 A1 | * | 7/2002 | Kloth ......................... 370/220 |
| 2003/0117949 A1 | * | 6/2003 | Molter et al. ................ 370/219 |

OTHER PUBLICATIONS

"Interconnection Networks: An Engineering Approach"; J. Duato, S. Yalamanchili, L. Ni; IEEE Computer Society; 1997.

* cited by examiner

*Primary Examiner*—Ricky Q. Ngo
*Assistant Examiner*—Warner Wong
(74) *Attorney, Agent, or Firm*—Victoria Donnelly

(57) ABSTRACT

A switch module for a communication network switch comprises first and second switching units each for communicating with one or more network communication interfaces, and a switch interface connected to each of the first and second switching units and having a pair of communication ports for enabling data to be transferred on to a local communication path which is connected between the local communication ports.

15 Claims, 9 Drawing Sheets

SWITCH AND A SWITCHING APPARATUS FOR A COMMUNICATION NETWORK

FIELD OF THE INVENTION

The present invention relates to a switch and switching apparatus for a communication network, and in particular to a switch and switching apparatus having redundancy.

BACKGROUND OF THE INVENTION

A typical communication network switch has a switching core and an array of communication network interfaces connected to the switching core. The network interfaces pass data traffic from the communication network to the switching core which directs the data traffic back to the appropriate communication interfaces for continued transmission over the network. Multiple network interface cards are accommodated in equipment shelves and are arranged to aggregate network traffic and feed the aggregated traffic to the central switching core. The capacity of a switching core has a maximum upper limit and therefore a service provider must select a switching core with the required capacity for the particular network. Since the demand for network bandwidth is not static, but typically increases over time, a service provider may either change the switching core from time to time to meet the required capacity, or purchase a switching whose capacity exceeds that of the present bandwidth requirements, with a view to connecting additional network interface cards to the switching core, as the demand for extra capacity increases. One drawback of the first option is that each time a switching core needs to be upgraded to a higher capacity switching core, network traffic cannot be serviced by the switch and therefore a second central core (providing redundancy to the active core) must be invoked, in which case redundancy is lost, or traffic must be re-routed around the switch, if possible. Customers may also experience a complete loss of service during the period over which the switching core is being replaced, and the service provider may suffer a loss of revenue. A drawback of the second option is that a service provider must invest in a switching core, part of whose potential capacity is not initially used, and therefore does not generate revenue, and may not generate any revenue for some time. High capacity switches, for example having a traffic handling capacity of the order of terabits are complex and expensive, and the cost of the initial investment in capacity to meet future demand and the period over which the capacity is underused may render these switches inaccessible to at least some service providers.

Communication network switches require a level of fault tolerance, and this is normally provided by duplicating the central switching core so that a second core can take over switching functions of the active core if the active core experiences a fault. The standby core usually has the same capacity as the active core and therefore the provision of a second switching core to provide fault tolerance significantly increases the cost, particularly for high capacity switches.

SUMMARY OF THE INVENTION

According to one aspect of the present invention, there is provided a switch for a communication network, comprising: a first switching unit for communicating with one or more communication interfaces, a second switching unit for communicating with the one or more communication interfaces, and switch interface means for communicating with the first and second switching units and having a communication port for enabling at least one of data to be transferred to the switch interface means and data to be transferred from the interface means.

In this arrangement, the switch has first and second switching units, each of which is capable of communicating with one or more communication interfaces. Accordingly, if one of the switching units fails, the other switching unit may be invoked to enable communication between the switch and the communication interfaces to continue. The switch further includes a switch interface means associated with the switching units and which has at least one interface port, and enables data to be transferred between the switching units and the interface port(s). The interface port is connectable to a local communication path which may be coupled to an interface port of another similar switch, which may communicate with one or more other communication interfaces. Thus, the switch interface enables data to be transferred between different switches, and ultimately between different communication interfaces coupled to different switches. Since the number of communication interfaces that may be connected to a single switch is normally limited, the switch interface, which enables data to be transferred from one switch to another allows switches, and therefore communication interfaces to be added as required.

In one embodiment, the switch interface means includes first and second communication ports for data communication, and each being connectable to a communication path. Advantageously, this enables the switch to be connected into a communication path ring so that data may be transferred between the switch and another switch via two possible routes.

In one embodiment, the switch interface means is adapted for enabling data to be transferred between the first and second ports. Advantageously, this arrangement provides continuity of the communication path in which the switch is connected so that data which is not intended for the switch can be readily transferred across the switch.

In one embodiment, the switch interface means includes one or more further communication ports, and the switch interface means is conditioned to enable data to be transferred between any of the communication ports. Advantageously, this arrangement enables data to be transferred from one communication path to another communication path.

In one embodiment, the switch interface means includes a first switch interface having a first communication port for connection to a communication path and a second switch interface having a second communication port for connection to a communication path.

The first switch interface may be connected to the first switching unit and the second switch interface may be connected to the second switching unit. Advantageously, the provision of first and second switch interfaces each having an interface port connectable to the same communication path enables data to be transferred between the second switching unit and the local communication path independently of the first switch interface, so that if either of the first switching unit or the first switch interface fails, data may still be transferred onto to the local communication path and therefore to other similar switches. Thus, the switch provides a switch module having its own redundancy capability and to which other switch modules may be connected to provide a robust, expandable and scaleable modular switching system.

In one embodiment, at least one of the first and second switching units is removable from the switch so that the other switching unit can operate in its absence. This arrangement enables the switch to continue to operate in the absence of one switching unit so that a faulty switching unit can be replaced without the switch causing a loss of service.

In one embodiment, the first and second switch interfaces are interconnected to enable data to be transferred therebetween. In one embodiment, the first and second switch interfaces may be adapted to enable data to be transferred between the first switching unit and the second switch interface. This arrangement may be adapted, for example, to enable data received by the first switching unit, and which is destined for another switch coupled to the local communication path, to be routed onto the first communication path either from the first interface port or the second interface port, thereby allowing the switch to route data to another switch along the most appropriate (e.g. shortest or most direct) section of the local communication path.

Similarly, the first and second interfaces may be adapted to enable data received by the second switching interface from the local communication path to be transferred to the first switching unit via the first switch interface.

In another embodiment, the first and second switch interfaces may be adapted to enable data to be transferred between the second switching unit and the first switch interface, so that, for example data received by the second switching unit destined for the local communication path can be routed onto the local communication path via either of the first and second interface ports, so that the appropriate route for that data can be selected. The first and second switch interface may be arranged to enable data received by the first switch interface from the local communication path to be directed to the second switching unit via the second switch interface. The first switching unit may be detachable from the switch independently of the first switch interface so that data can continue to be transferred between the first and second switch interfaces so that the first switch unit can be replaced or repaired without affecting the quality of service.

In another embodiment, the first and second switch interfaces may be arranged to enable data to be transferred between the first and second interface ports. Advantageously, this arrangement enables data which is transported along the local communication path, but which is not intended for the switch, to pass through the switch and return to the local communication path.

According to another aspect of the present invention, there is provided a switching apparatus for a communication network comprising a plurality of switch modules, each switch module comprising a switching unit for connection to at least one communication interface, a switch interface for communication with said switching unit and having first and second communication ports, and wherein the first communication port of each switch module is connected to the second communication port of another switch module such that said switch modules are connected in a first communication path ring.

According to another aspect of the present invention, there is provided a switching circuit for a communication network switch, comprising a switching unit having a plurality of ports, each for connection to a communication interface, the switching units being adapted to direct data between the ports, a switch interface coupled to the switching unit and having at least one communication port, the switch interface being adapted to transfer data between the switching unit and the at least one communication port.

BRIEF DESCRIPTION OF THE DRAWINGS

Examples of embodiments of the present invention will now be described with reference to the drawings, in which.

DESCRIPTION OF EMBODIMENTS

Figure 1:
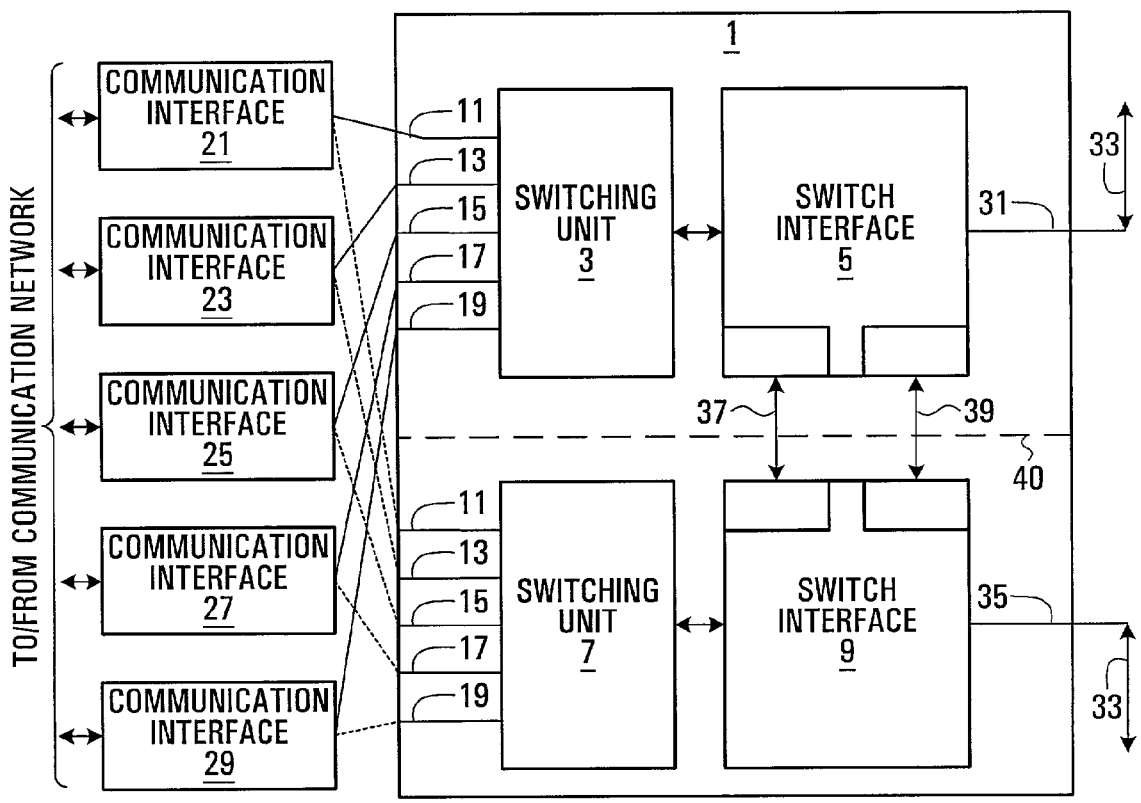
FIG. 1 shows a schematic diagram of a switch according to an embodiment of the present invention.

Referring to FIG. 1, a switch 1 for a communication network, according to an embodiment of the present invention, comprises a first switching unit 3, a first switch interface 5, a second switching unit 7 and a second switch interface 9. The first and second switching units 3, 5 each have a plurality of communication ports 11, 13, 15, 17, 19, each for connection to a communication interface 21, 23, 25, 27, 29. In this embodiment, each communication interface is connected to a communication port of the first switching unit 3 and a communication port of the second switching unit 7.

The first switching unit and first switch interface are interconnected to enable data to be transferred therebetween, and the first switch interface includes a local communication port 31 for connection to a local communication path 33. The second switching unit 7 and the second switch interface 9 are also interconnected to enable data to be transferred therebetween, and the second switch interface 9 has a local communication port 35 for connection to the local communication path 33.

In this embodiment, each of the first and second switching units are capable of providing local switching to enable data to be transferred between different communication interfaces 21, 23, 25, 27, 29. Each switching unit 3, 7 is also capable of routing data received from the communication interfaces to its associated switch interface 5, 9 for transmission along the local communication path 33, and is also capable of directing data to the appropriate communication interface from the local communication path via its associated switch interface 5, 9. In operation, one of the first and second switching units 3, 7 is active to provide switching functions and the other is inactive but can be invoked to provide the same switching functions as the active unit, if the active unit fails or experiences a fault. For example, the first switching unit 3 may serve as the active unit and the second switching unit 7 may serve as the standby unit (or vice versa). In this case, the first switching unit 3 provides local switching to enable data to be transferred between different communication interfaces 21, 23, 25, 27, 29 connected thereto, and to direct data which is intended for the local communication path 33 to the first switch interface 5.

In this embodiment, the first and second switch interfaces 5, 9 are interconnected by a transfer interface 37 which enables data received by the first switch interface from the first switching unit 3 to be transferred to the second switch interface 9, and data received by the second switch interface 9 from the local communication path 33 to be transferred to the first switching unit 3 via the first switch interface 5. This arrangement enables the switch to route data received by the first switching unit 3 along the local communication path either from the local communication port 31 of the first switch interface 5 or from the local communication port 35 of the second switch interface 9.

In this embodiment, the switch 1 further includes a passthrough interface 39 interconnecting the first and second switch interfaces 5, 9 and which enables data received by the first switch interface from the local communication path 33 to be transferred to the second switch interface 9 and back onto the local communication path 33, and vice versa. In this way, data which is not intended for any of the communication interfaces to which the switch is connected can pass through the switch to its intended destination.

In the event that the first switching unit 3 fails, experiences a fault or is otherwise de-activated, the second switching unit 7 can be invoked to provide the required switching functions. In this case, the second switching unit 7 can perform local switching functions to enable data to be transferred between different communication interfaces 21, 23, 25, 27, 29, and can pass data from the communication interfaces intended for the local communication path to the second switch interface 9, and pass data received by the second switch interface 9 to the intended communication interface. The second switch interface 9 directs data intended for the section of the local communication path to which it is connected to its local communication port 35, and directs data intended for the section of the local communication path to which the first switch interface is connected to the first switch interface 5 via the transfer interface 37. In this way, the switch is capable of continuing to perform all of its switching functions without loss of service and without a degradation in the quality of service if the active switching unit fails.

In one embodiment, the first switching unit 3 can be removed from the switch independently of the second switching unit, so that the switch can continue to perform its switching functions while the first switching unit is replaced. In one embodiment, the first switching unit may be removable from the switch independently of the first switch interface 5, so that the switch can continue to operate in the absence of the first switching unit without a degradation in the quality of service.

In another embodiment, the first switch interface 5 may be separable from the second switch interface 9 and removable from the switch independently of the second switch interface. For example, the first and second switch interfaces may be mounted on separate or separable substrates as indicated by the dashed line 40. Alternatively, they may be mounted on the same substrate and individually removable therefrom. The first switch interface may further be removable from the switch independently of the first switching unit or may only be removable from the switch with the first switching unit. In either case, the switch can continue to operate without the first switching unit and the first switch interface, allowing both the first switching unit and switch interface to be removed from the switch and replaced, if required. In this case, the second switching unit 7 is activated and provides local switching functions between different communication interfaces and passes data intended for the local communication path to the second switch interface 9. As the first switch interface 5 is disconnected from the second switch interface 9, all data which is intended for the local communication path is transmitted onto the local communication path from the second switch interface 9. However, as other switches connected to the local communication path are accessible through either of the first switch interface or the second switch interface, the switch is still operative to transmit data to and receive data from any other switch which is also connected in the local communication path so that switch-to-switch connectivity is retained. The loss of the first switch interface 5 means that data from the switch can only be launched onto the local communication path in one direction which may not be the most efficient or effective route for transmitting data to a particular switch, and may for example require the data to pass over a longer section of the local communication path or through a larger number of switches than would otherwise be required if the data could have been transferred onto the local communication path via the first switch interface, and this may or may not affect the quality of service, depending on the data traffic density and the bandwidth or capacity of the local communication path.

Similarly, data intended for the switch transmitted by another switch connected to the first communication path may be transmitted to the switch along the route which is connected to the local communication port 35 of the second switch interface. Again, since the option of transmitting the data along the local communication path to the first switch interface, in the opposite direction, is not available, the quality of service may or may not be affected, again depending on the length of the local communication path between the transmitting and receiving switches, the number of intermediate switches between the transmitting and receiving switches, the actual traffic density and the bandwidth or capacity of the local communication path. As mentioned above, the switch may be interconnected with one or more similar switches to form an enlarged modular switching system that may be readily expanded or contracted simply by adding or removing one or more switch modules. An example of a modular switching system having a plurality of interconnected switch modules is shown in FIG. 2.

Figure 2:
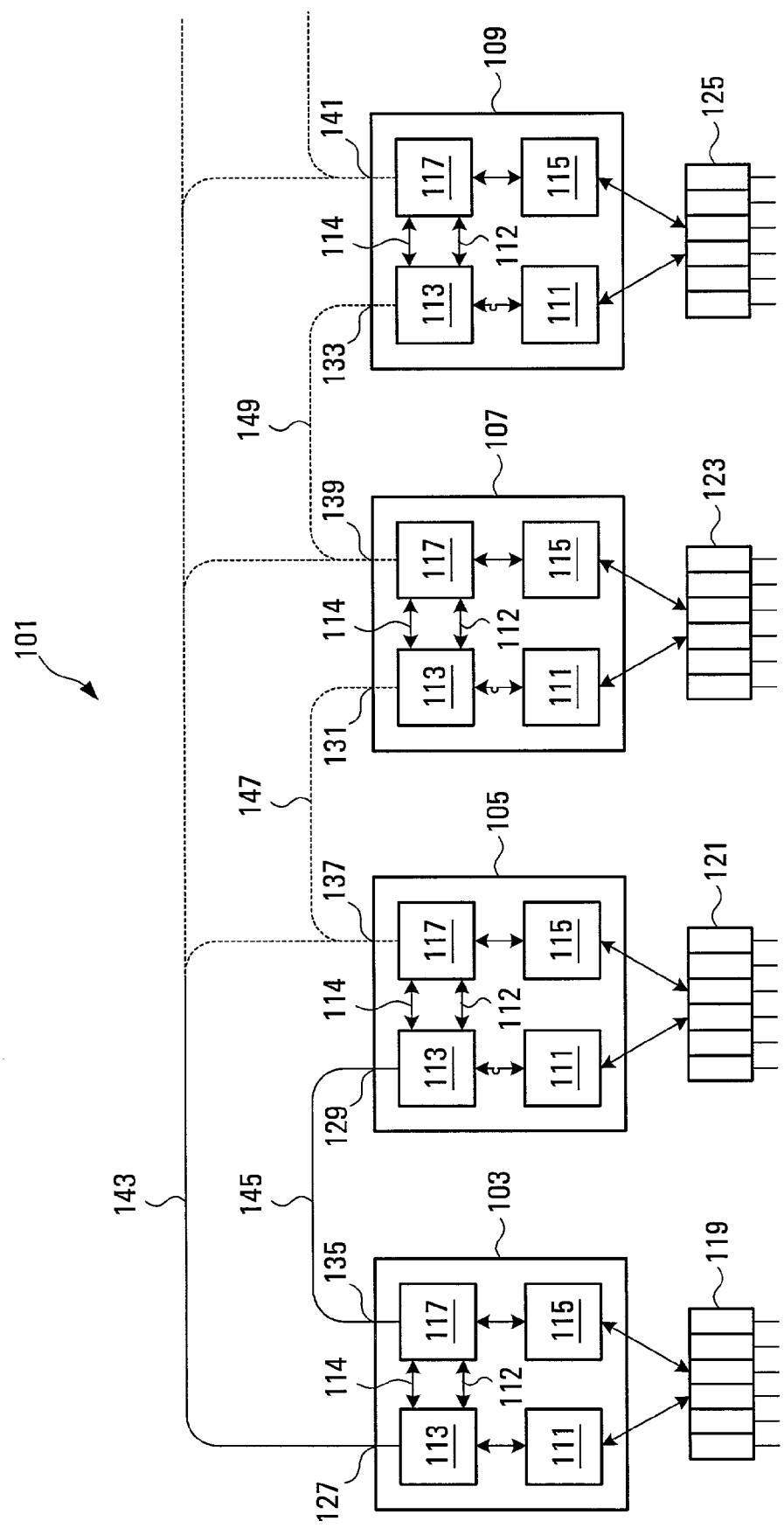
FIG. 2 shows a block diagram of an array of interconnected switch modules according to an embodiment of the present invention.

Referring to FIG. 2, a modular switching system 101 comprises a plurality of switch modules 103, 105, 107, 109. Each switch module, which may be similar to the switch described above and shown in FIG. 1, has a first switching unit 111, a first switch interface 113, a second switching unit 115 and a second switch interface 117. Each of the first and second switching units 111, 115 are coupled to respective first and second switch interfaces 113, 117 to pass data therebetween, and each switch module has a transfer interface 112 and a passthrough interface 114 for passing data between the first and second switch interfaces 113, 117. As for the embodiment described above and shown in FIG. 1, the transfer interface passes data derived from or intended for a communication interface, and the passthrough interface 114 passes data derived from or intended for one or more local communication path(s). The first and second switching units 111, 115 are connected to a plurality of communication interfaces 119, 121, 123, 125. Each of the first switch interfaces 113 has a local communication port 127, 129, 131, 133 for connection to a local communication path, and each of the second switch interfaces 117 also have a local communication port 135, 137, 139, 141 for connection to the local communication path.

Considering the modular switching system as initially having just two switch modules 103, 105, the local communication port 127 of the first switch interface 113 of the first module 103 is connected to the communication port 137 of the second switch interface 117 of the second module 105 by a communication link 143, and the local communication port 135 of the second switch interface 117 of the first module 103 is connected to the communication port 129 of the first switch interface of the second module 105. Thus, data may be transferred between the first and second switch modules 103, 105 via two possible routes, and therefore the local communication path, which includes the first and second links 143, 145, and which interconnects the first and second modules 103, 105, has a ring or toroid-like topology. If one of the switching units 111, 115 of either switch module 103, 105 fails, data may continue to be transferred between the switch modules via either of the two possible routes. On the other hand, if one of the switch interfaces 113, 117 fails or is removed, so that data can no longer be transmitted onto the communication link to which it is connected, data may still be transferred between the switch modules using the other switch interface and its associated communication link.

Adding a second switch module 105 to the first switch module effectively provides a switch having an increased number of available communication ports and therefore increases the number of communication interfaces (e.g. line cards) that can be connected to the modular switch. If the second module has the same number of communication ports as the first, adding a second module effectively doubles the number of available communication ports.

In order to add a third switch module 107, the first communication link 143 may simply be disconnected from the local communication port 137 of the second switch interface of the second module 105, and connected to the local communication port 139 of the second switch interface 117 of the third module 107, and the local communication port 137 of the second switch interface 117 of the second module 105 may be connected to the local communication port 131 of the first switch interface 113 of the third module 107 by a third communication link 147. The communication link 143 may be extended if required, or may be replaced altogether with another link by disconnecting the original link also from the local communication port 127 of the first module 103.

In this way, the third switch module 107 is connected into the local communication path loop or ring, such that data can be passed from the third switch module 107 onto the ring in either direction, i.e. either onto communication link 147 connected to the second switch module 105, or onto the first communication link 143 connected directly to the first switch module 103. Similarly, data can be received by the third switch module from the local communication path from either direction along the ring, i.e. over the third communication link 147 or over the first communication link 143.

This interconnect scheme also allows data to be transferred between one switch module and any other switch module in either direction along the local communication path loop. For example, data may be transferred from the third switch module 107 to the first switch module 103 either directly via the first communication link 143 or via the other part of the loop, which includes the second module 105, in which case data is transferred from the first switch interface 113 of the third switch module 107 to the second switch interface 117 of the first switch module 103 via the third communication link 147, the second switch interface 117 of the second module, the passthrough interface 114, the first switch interface 113 of the second module and the second communication link 145. Thus, the first and second switch interfaces 113, 117 and the passthrough interface 114 may effectively constitute part of the local communication path.

It is to be noted that since the second communication link 145 can remain intact while the modular switch is expanded to include the third switch module 107, data can continue to be transferred between the first and second switch modules, without loss of service, although the first and/or second switch modules may need to be adapted such that any data which is to be transferred between the first and second switch modules is passed over the second communication link 145 rather than the first communication link 143.

Assuming the first switching unit 111 of the third switch module 107 serves as the active switch unit, and the second switch unit 115 serves as a standby switch unit, if the active switch unit 111 fails or is removed from the switch module, the standby switch unit 115 can be activated, and communication can continue between the switch module and its associated communication cards 123. If the first switch interface 113 of the third switch module 107 fails, or is removed from the switch module, the standby switch unit 115 can be activated, and data transferred between the communication interfaces 123 and the other communication interfaces 119, 121 associated with the other modules over the first communication link 143 of the local communication loop.

The modular switch 101 may be expanded further to include a fourth switch module 109 (and subsequent switch modules, as required). The fourth switch module 109 may be connected into the local communication path loop by disconnecting the first communication link 143 from the local communication port 139 of the second switch interface 117 of the third switch module and connecting the first communication link 143 to the local communication port 141 of the second switch interface 117 of the fourth switch module 109, and connecting the local communication port 139 of the second switch interface 117 of the third switch module 107 to the local communication port 133 of the first switch interface 113 of the fourth switch module 109 by a fourth communication link 149.

Adding a fourth switch module only requires one of the two possible communication paths between the first and third switch module to be temporarily broken, the other path, which is provided by the second and third communication links 145, 147 and the passthrough interface between the first and second switch interfaces of the second switch module 105, remaining in situ. Therefore, while the fourth switch module is being added into the modular switch, data can continue to be transfer between any of the first, second and third switch modules, although the switch modules may need to be adapted to direct data intended for another switch module over the section of the local communication loop which remains intact.

It can be seen that, once the fourth switch module 109 has been installed, the fourth switch module has access to each of the first, second and third switch modules via two possible routes. For example, the fourth switch module 109 has access to the second switch module 105 either via the first and second communication links 143, 145 and the passthrough interface of the first switch module, or via the third and fourth communication links 147, 149 and the passthrough interface of the third switch module 107.

Assuming the first switching unit 111 of the fourth switch module 109 serves as the active switch unit and the second switch unit 115 serves as the standby switch unit, if the active switch unit 111 fails or is removed from the switch module, the standby switch unit 115 can be invoked and communication can continue between the switch module and its associated communication cards 125. If the first switch interface 113 of the fourth switch module 109 fails or is removed from the switch module, the standby switch unit 115 can be activated, and data transferred between the communication interfaces 125 and the other communication interfaces 119, 121, 123 associated with the other switch modules over the first communication link 143 of the local communication loop. Thus, the switch module according to embodiments of the present invention enable a modular switch to be built and expanded, as required, and the local redundancy capability of each module significantly enhances the resiliency and preserves the integrity of the modular switch in the event that a switching unit and/or a switch interface of a module fails or is removed from the module. Advantageously, the system also allows a service provider to expand and scale the capability of the communication switch incrementally and only as required, thereby obviating the need for large initial investments in the purchase of a single large capacity switch (or two large capacity switches for redundancy) whose maximum capacity is fixed and therefore cannot be scaled and whose total switching capacity may be underused for some time.

In another embodiment of the present invention, the switch may have additional communication ports to enable the switch to be interconnected to other switches via one or more other local communication paths. Advantageously, this increases the flexibility with which additional switches can be added and also enables the degree of connectivity between one switch and another switch to be increased by increasing the number of possible communication paths by which the switches are interconnected. Increasing the number of potential communication paths connecting any two switches may both increase the traffic carrying capacity of a modular switch formed by these switch modules and also increase its resilience to a fault or failure in one of the modules. An example of a switch module having a plurality of communication ports for connection to a plurality of different local communication paths is shown in FIG. 3.

Figure 3:
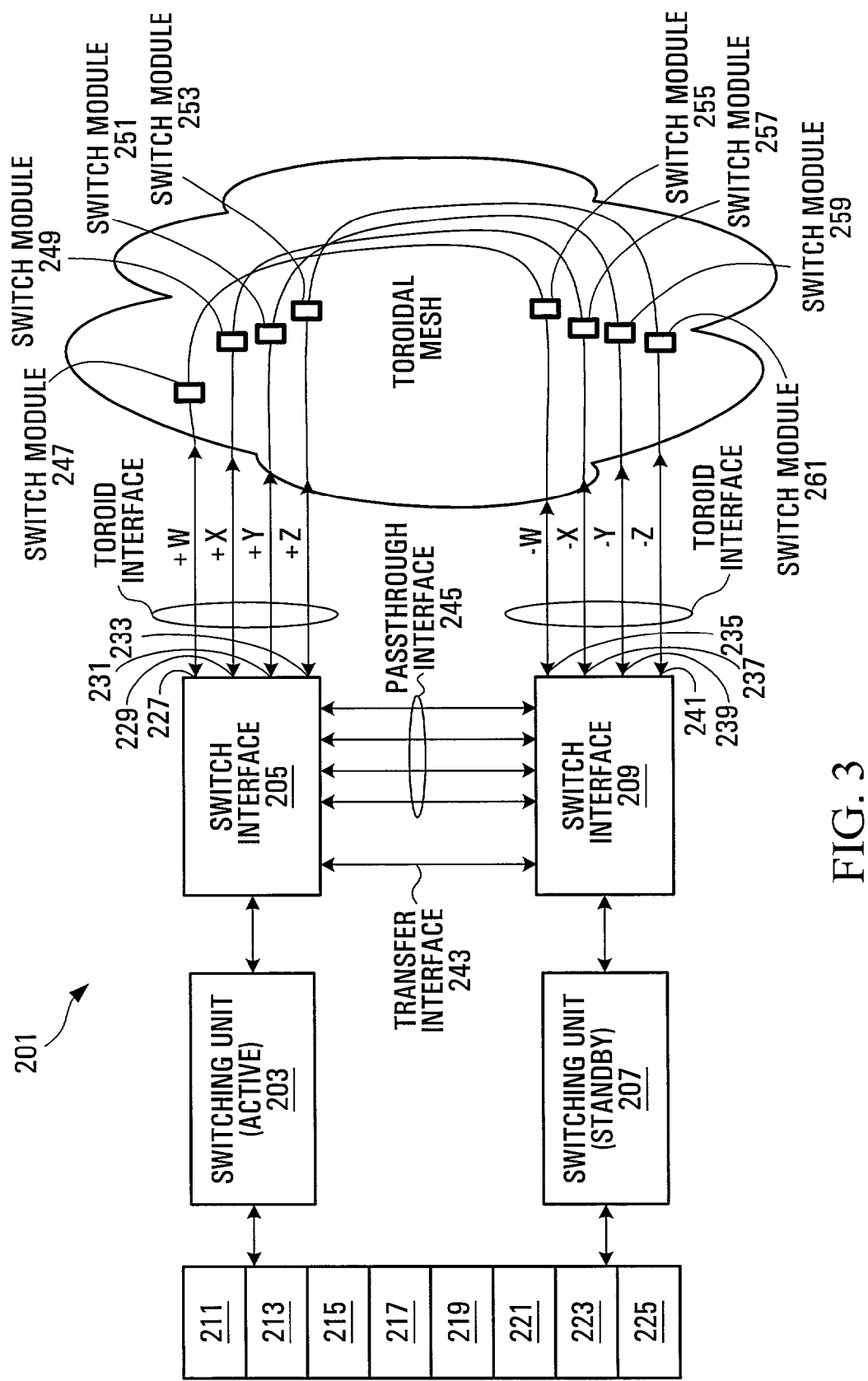
FIG. 3 shows a block diagram of a switch module according to an embodiment of the present invention.

Referring to FIG. 3, a switch module 201 comprises a first switching unit 203, a first switch interface 205, a second switching unit 207 and a second switch interface 209. Each of the first and second switching units 203, 207 are coupled to a plurality of communication interfaces (e.g. line cards) 211, 213, 215, 217, 219, 221, 223 and 225. Each switching unit provides a local switching function and controls the transfer of data between the various communication interfaces.

Each of the first and second switch interfaces 205, 209 has a plurality of local communication ports for enabling data to be transferred into and out of the switch 201 from and to a plurality of different local communication paths. In the present embodiment, the first and second switch interfaces each have four local communication ports 227, 229, 231, 233, 235, 237, 239, 241, allowing the switch 201 to be connected directly to eight other switches 247 to 261.

The first and second switch interfaces 205, 209 are interconnected by a transfer interface 243 and by a passthrough interface 245.

In operation, one of the switching units 203, 207 serves as the active unit and the other as the standby unit which may be activated to take over switching functions from the active unit if the active unit fails. Assuming for the purposes of illustration, that the first switching unit 203 is the active unit, the switching unit directs data which is intended for another switch to the first switch interface 205. The first switch interface 205 serves to direct data onto its local communication ports 227, 229, 231, 233, as appropriate, and to direct data received from the first switching unit 203 which is intended for transmission onto the local communication paths connected to the second switch interface 209 to the second switch interface 209 via the transfer interface 243.

In one interconnect scheme, the switch may be connected in four different local communication path rings or loops. Thus for example, the first local communication ports 227, 235 of the first and second switch interfaces may be connected in a first local loop or toroid W, the second local communication ports 229, 237 of the first and second switch interfaces may be connected in a second local loop X, the third pair of local communication ports 231, 239 connected in a third local loop Y and the fourth pair of local communication ports 233, 241 connected in a fourth local loop Z. Thus, the switch is able to direct data onto any one of the four local rings W, X, Y, Z in either direction, designated +W, +X, +Y, +Z if transferred to or from the first switch interface 205, and designated −W, −X, −Y and −Z, if transferred to or from the second switch interface 209.

The passthrough interface 245 enables data received by one switch interface 205, 209 from the local communication loops or toroids to be transferred to the other switch interface and transmitted onto the local communication loops or toroids connected thereto.

In this embodiment, each switch interface 205, 209 is also capable of transferring data received from one communication path onto a different communication path. Thus, the first switch interface 205 is capable of transmitting data received on any of the local communication paths +W, +X, +Y and +Z to which it is connected onto any other communication path +W, +X, +Y or +Z, and similarly, the second switch interface 209 is capable of directing data received on any one of the four communication paths −W, −X, −Y, −Z to which it is connected onto any other communication −W, −X, −Y, −Z. The first and second switch interfaces, together with the passthrough interface may be arranged to enable data received at any one of local communication ports of one of the switch interfaces 205, 209 to be directed on to any one of the local communication ports of the other switch interface. This ability to perform inter-loop transfers in either direction significantly increases the flexibility and number of possible routes over which data can be transmitted between different switch modules.

Figure 4:
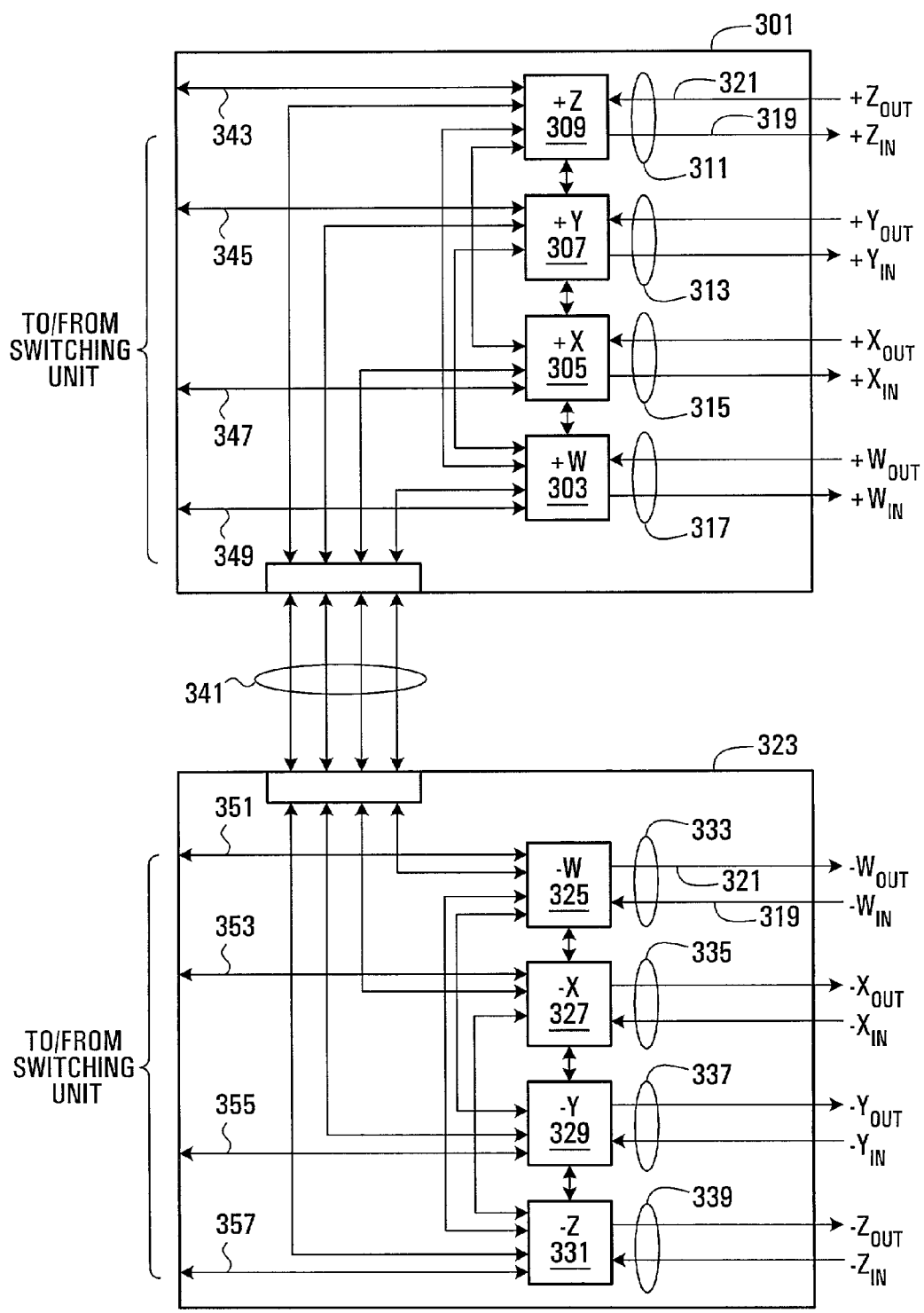
FIG. 4 shows a schematic diagram of interconnected switch interfaces according to an embodiment of the present invention.

FIG. 4 shows an embodiment of the first and second switch interfaces in more detail. The first switch interface 301 comprises a plurality of interconnected interface devices 303, 305, 307, 309. Each interface device has a local communication port 311, 313, 315, 317 for connection to a local communication path. Each communication port enables bidirectional communication between the interface device and the communication path to which it is connected, and has an input 319 and an output 321. However, in other embodiments, one or more communication ports may be unidirectional. In this embodiment, the first switch interface has four interface devices each of which is interconnected to the other three interface devices to enable data to be transferred from one interface device to any other interface device so that data received on one communication path (or dimension) can be transferred to another communication path (or dimension).

Similarly, the second switch interface 323 has a plurality of interconnected interface devices 325, 327, 329, 331 each having a local communication port 333, 335, 337, 339 for connection to a local communication path. Each communication port enables bidirectional communication between its respective interface device and the communication path to which it is connected and has an input 319 and an output 321. However, in other embodiments, one or more communication ports may be unidirectional. In this embodiment, the second switch interface 323 has four interface devices each of which is interconnected to the other three interface devices to enable data to be transferred from one interface device to any other interface device. This enables data to be transferred from one local communication path (or dimension) to any other local communication path (or dimension).

Each of the interface devices 303, 305, 307, 309 of the first switch interface 301 and each of the interface devices 325, 327, 329, 331 of the second switch interface 323 are also interconnected via a passthrough interface 341 which enables data to be transferred between any interface device of the first switch interface 301 and any interface device of the second switch interface 323.

Each of the interface devices of the first switch interface 301 also has a data transfer port 343, 345, 347, 349 for data transfer between the device and the first switch unit (for example, unit 203 shown in FIG. 3), and each of the interface devices of the second switch 323 also has a data transfer port 351, 353, 355, 357 for data transfer between the interface device and the second switching unit (for example unit 207 shown in FIG. 3).

It is to be noted that a transfer interface for enabling data to be transferred between a switching unit connected to a respective switch interface and the other interface may also provided but is omitted from FIG. 4, for clarity.

In one embodiment, each interface device includes a system for managing the transfer of data received from the local communication path to which it is connected or from the passthrough interface to another interface device, and a system for managing the transfer of data received from another interface device onto the local communication path to which it is connected. For example, each interface device may include a memory or buffer for temporarily storing data received from its local communication path and/or the passthrough interface prior to its transmission to another interface device. Each interface device may also include a scheduler for managing the transfer of data from each of the other interface devices onto its local communication path. For example, the scheduler of one interface device may be coupled via a data transfer bus to the memory or buffer of another interface device so that data can be transferred from the memory under the control of the output scheduler. A separate control bus may be provided between one interface device and another for carrying control signals required to control data transfer from the memory or buffer of one interface device to the output scheduler of another interface device. Examples of interface systems for enabling data to be transferred from one interface device to another is described in the applicant's copending Canadian Application No. 2,366,397 filed on Dec. 31, 2001.

Although in the embodiment of FIG. 4, each switch interface has four local communication ports, other embodiments may have any other number of communication ports, for example one, two or more than two. The larger the number of local communication ports provided for a switch interface, the higher the number of local communication paths to which the interface can be connected.

Figure 5:
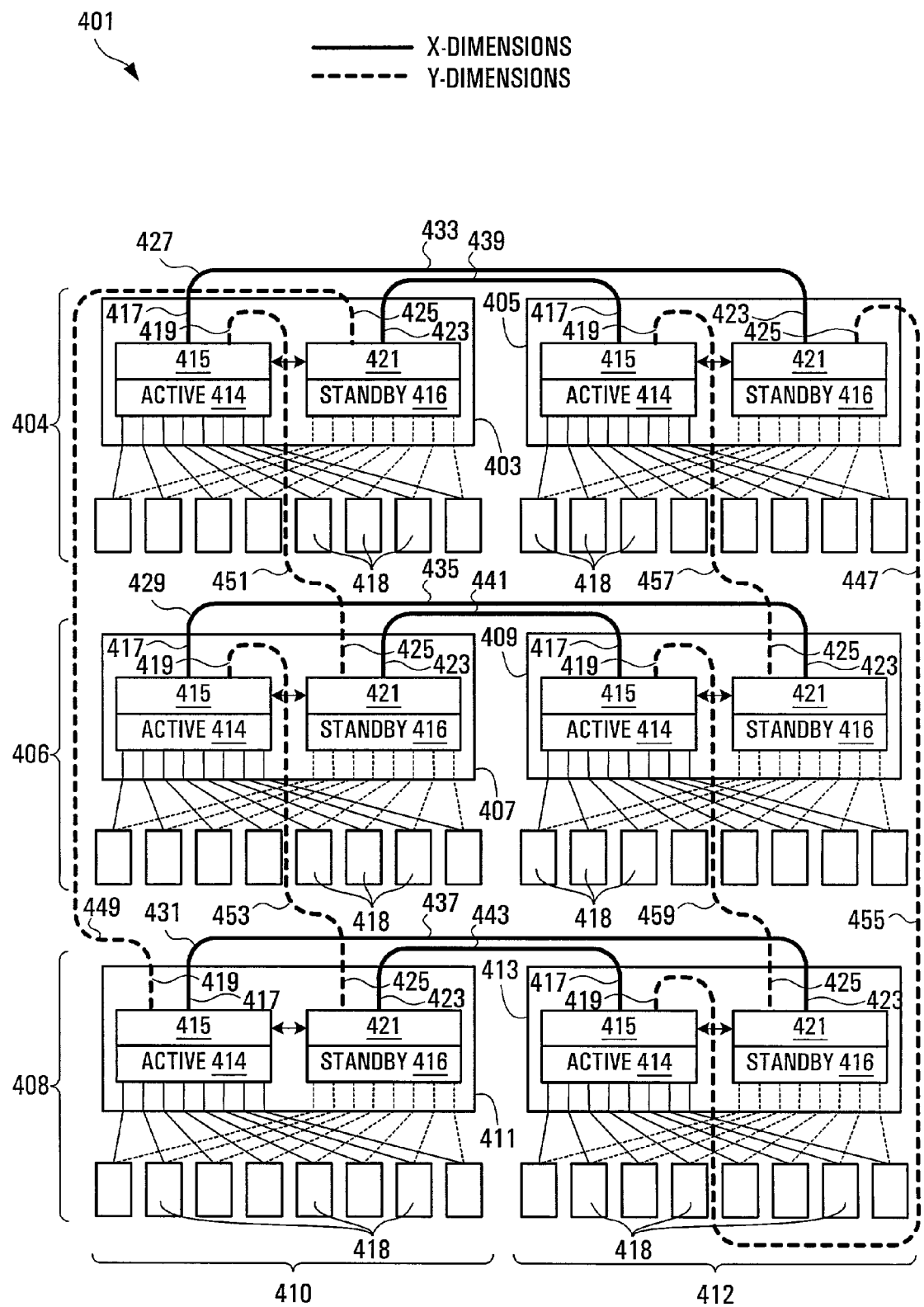
FIG. 5 shows a modular switch having a two dimensional array of interconnected switch modules according to an embodiment of the present invention.

The provision of two local communication ports on each of the first and second switch interfaces enables each switch module to be connected in two different local communication path loops or rings. FIG. 5 shows a two-dimensional array of switching elements and illustrates how the provision of two local communication ports on each of the first and second switch interfaces of each switch module can be used in an interconnect scheme which provides connectivity between every switch module in the array.

Referring to FIG. 5, a plurality of switch modules are arranged in a two-dimensional array of three rows 404, 406, 408 and two columns 410, 412. This arrangement may or may not be representative of how the switch modules are actually arranged in an installation for example, of racks or shelves. Each switch module may be similar to those described previously, and include first and second switching units 414, 416, each connected to a plurality of communication interfaces 418 and first and second switch interfaces 415, 421. The first switch interface 415 of each switch module has a first and second local communication port 417, 419, and the second switch interface 421 of each switch module has a first and second local communication port 423, 425. The switching modules in each row are interconnected in a respective first local communication path loop 427, 429, 431 (each of which may be referred as an X-dimensional loop, shown by the solid lines) comprising a first communication link 433, 435, 437 connecting the first local communication port 417 of the first switch interface 415 of each of the first switch modules 403, 407, 411 to the first local communication port 423 of the second switch interface 421 of each of the second switch modules 405, 409, 413 in each row, and a second communication link 439, 441, 443 connecting the first local port 423 of the second switch interface 421 of each of the first switch modules 403, 407, 411 of each row to the first local communication port 417 of the first switch interface 415 of each of the second switch modules 405, 409, 413 in each row. Thus, the switch modules in each row are interconnected via two possible communication paths provided by the loop or ring topology and are configured to enable data to continue to be transferred between the switch modules in each row if one of the switching units and/or its associated switch interface fails or is removed from the module.

The second local communication ports of the switch modules 403, 407, 411 in the first column 410 are used to interconnect these modules in a second local communication path loop or ring 445, and which may be referred to as a first Y-dimensional loop, shown by dashed lines. The second local communication ports of the switch modules 405, 409, 413 in the second column 412 are also used to interconnect these switch modules in another local communication path loop or ring 447 which may be referred to as a second Y-dimensional loop, also shown by dashed lines. The first Y-dimensional local communication path 445 includes a first communication link 449 connected between the second local communication port 425 of the second switch interface 421 of the first switch module 403 in the first row and the second local communication port 419 of the first switch interface 415 of the first switch module 411 in the third row, a second communication link 451 connected between the second local communication port 419 of the first switch interface 415 of the first switch module 403 in the first row and the second local communication port 425 of the second switch interface 421 of the first switch module 407 in the second row, and a third communication link 453 connected between the second local communication port 419 of the first switch interface 415 of the first switch module 407 in the second row and the second local communication port 425 of the second switch interface 421 of the first switch module 411 in the third row. This communication path 445 (which also includes the passthrough interface between the first and second switch interfaces of each switch module) interconnects each switch module 403, 407, 411 in the first column to the other switch modules in the first column via two possible routes so that data can continue to be transferred between each switch module in the event that a switching unit and/or switch interface of one of the modules fails or is removed from the module.

Similarly, the local communication path 447 interconnecting the switch modules 405, 409, 413 in the second column 412 comprises a first communication link 455 interconnecting the second local communication ports of the second switch interface 421 of the second switch module 405 in the first row and the first switch interface 415 of the second switch module 413 in the third row, a second communication link 457 interconnecting the second communication ports of the first switch interface 415 of the second switch module 405 in the first row and the second switch interface 421 of the second switch module 409 in the second row, and a third communication link 459 interconnecting the second local communication ports 419, 425 of the first switch interface 415 of the second switch module 409 in the second row and the second switch interface 421 of the second switch module 413 in the third row. Again, this interconnect scheme (together with the passthrough interfaces) ensures that each of the switch modules in the second column are interconnected to the other switch modules in the second column via two possible routes so that if one of the switching units and/or its associated switch interface of one of the switch modules fails or is removed, data can continue to be transferred between the modules.

In this embodiment, each switch interface is capable of transferring data between its respective first and second local communication ports, which allows data to be transferred between different local communication loops, and therefore between switch modules positioned in both different rows and different columns. For example, data may be transferred from the first switch module 403 in the first row to the second switch module 409 in the second row by transferring data over the first communication path 427 to the second switch module 405 of the first row, using either of the two possible routes and from the second switch module 405 onto the local communication path 447 to the second switch module 409 in the second row, again using either of the two possible communication path routes. Alternatively, data may be transferred from the first switch module 403 of the first row to the second switch module 409 of the second row via any one of the first switch module 407 of the second row, or via the first and second switch modules 411, 413 of the third row.

As can be appreciated from this example, each of the switch modules are interconnected to each of the other switch modules in the array via a number of different diverse routes. The degree of connectivity between the switch modules in the array may be increased by increasing the number of local communication ports provided for each switch interface. For example, if a third local communication port is provided for each switch interface, this can be used to interconnect switch modules contained in both different rows and different columns.

Figure 6:
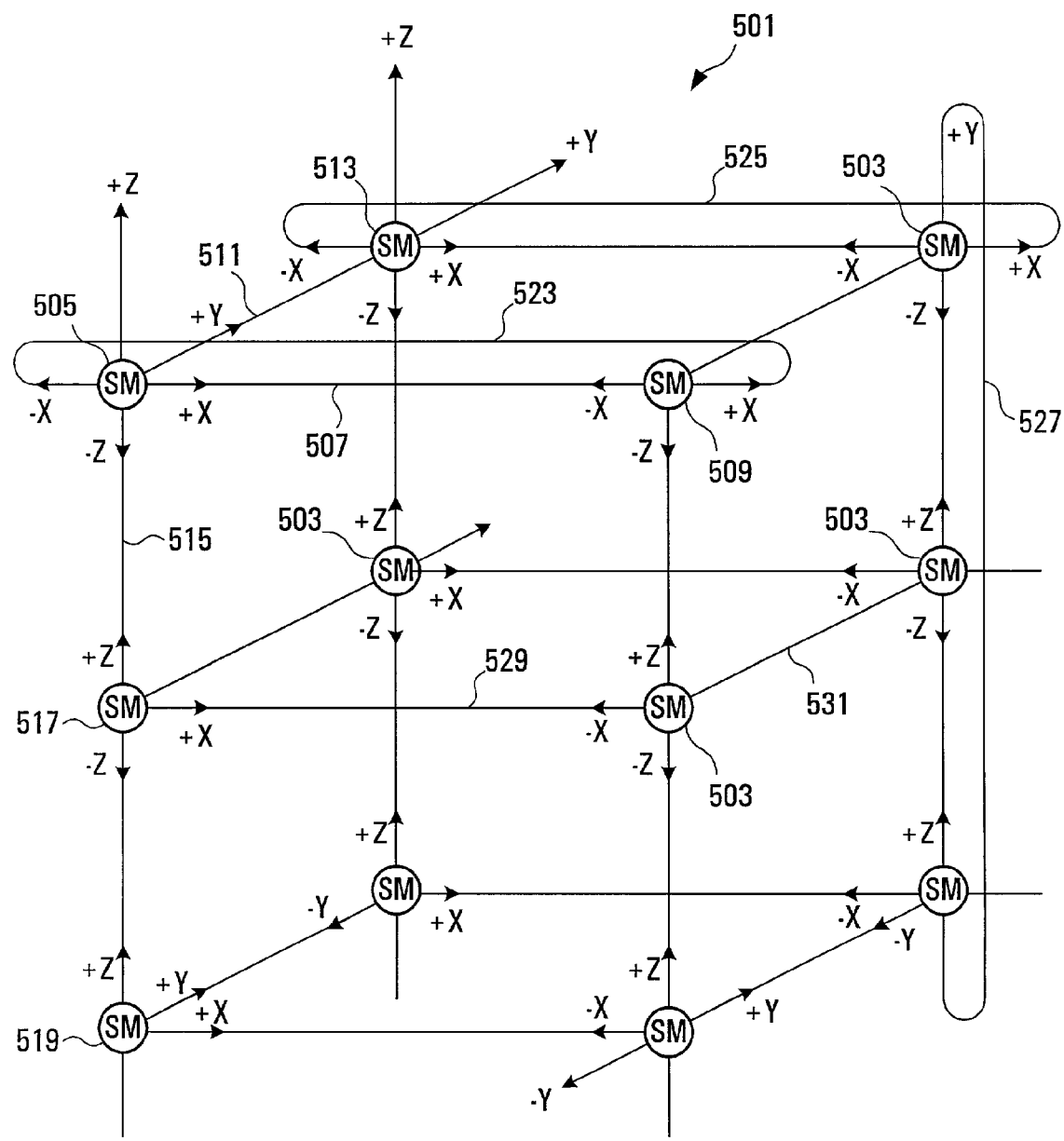
FIG. 6 shows a schematic block diagram of a three-dimensional array of interconnected switch modules according to an embodiment of the present invention.

In another embodiment, a switch module may have at least three local communication ports for each switch interface, and each port may be used to connect the module to other switch modules in a three-dimensional array, with each communication port connecting the switch module to another module along a local communication path in each of three dimensions. An example of a modular switch having a plurality of switch modules arranged in a three-dimensional array as shown in FIG. 6. The modular switch 501 has a plurality of switch modules 503 having first and second switch interfaces,(not shown) each having at least three communication ports for enabling the switch module 503 to be connected in three local communication path loops. For example, a first switch module 505 is connected in a first local communication path 507 which extends along the X-dimension, and which may include any number of further switch modules, and, in this embodiment, connects the first switch module 505 to a second switch module 509 on the X-dimensional path. The first switch module 505 is connected in a second local communication path 511 which extends along the Y-dimension, and connects the first switch module to a neighbouring switch module 513. The first switch module 505 is also connected in a third local communication path 515 which extends along the Z-dimension and connects the first switch module 505 to one or more other switch modules 517, 519 which are also connected in the Z-dimensional communication path.

Preferably, each of the first and second switch interfaces of each module has the capability of transferring data between each of the communication ports so that the interfaces can transfer data between the different local communication paths to which it is connected. Thus, each switch module can direct data traffic along any one of three dimensions in either direction, and this enables data to be transferred from one switch module to any other switch module within the three-dimensional array over a number of different possible routes.

The local communication paths in which switching modules are connected may either have a loop or ring topology, thereby interconnecting each switch module to another switch module via two possible routes as exemplified by local communication path loops 523, 525, 527 shown in FIG. 6, or switch modules may be interconnected by a single path, as exemplified by communication paths 529, 531, in FIG. 6, although a second path may be added to these paths to provide a loop or ring topology. Thus, a modular switch may include local paths all of which have a ring topology, or all of which have a single interconnect topology, or a mixture of these.

Figure 7:
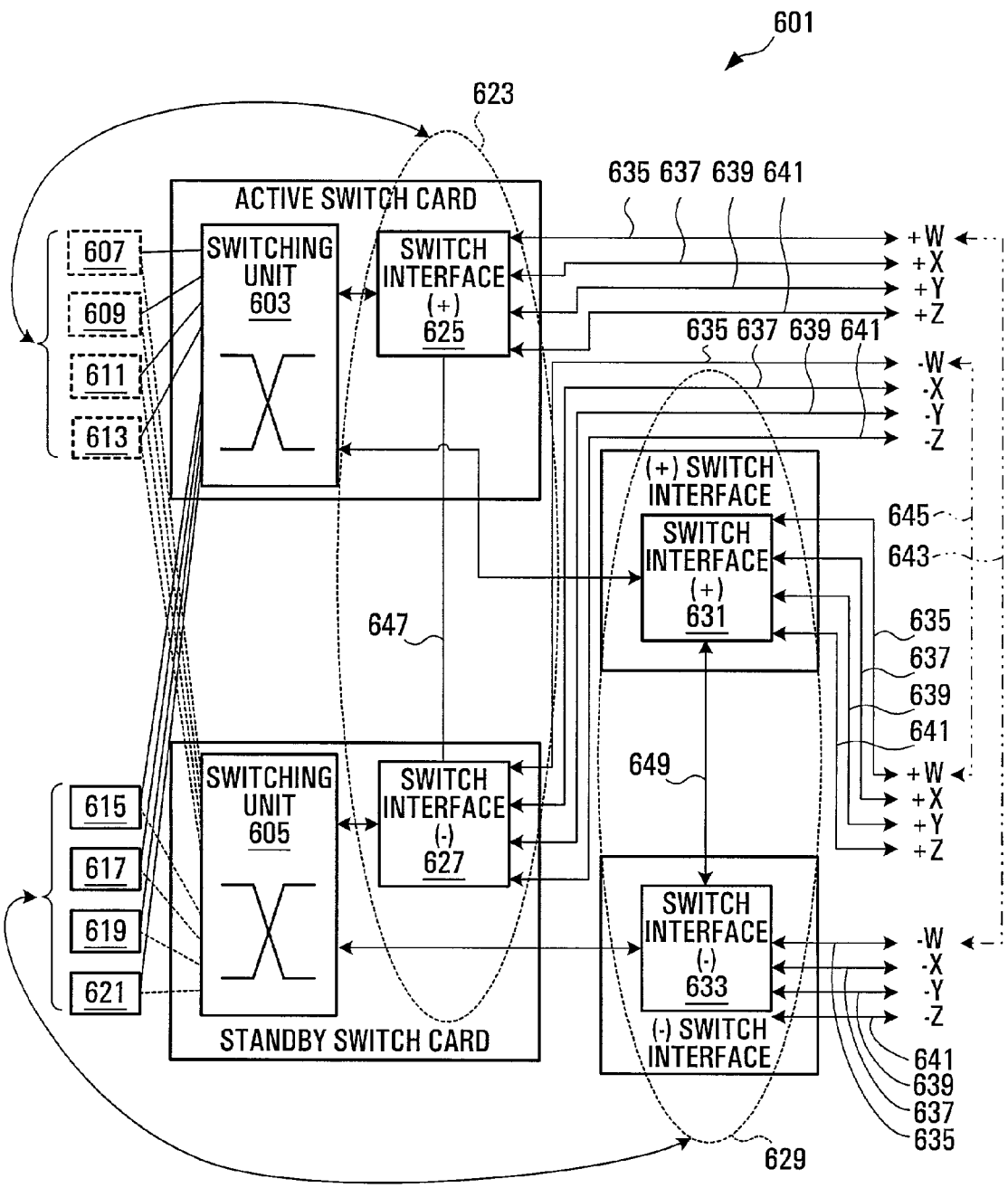
FIG. 7 shows a diagram of a switch module according to another embodiment of the present invention.

In another embodiment, the switch module may include one or more further sets of first and second switch interfaces to increase the capacity of the switch module, and for example increase the number of communication interfaces that can be connected to the switch module. An example of a switch module having a second set of first and second switch interfaces is shown in FIG. 7. Referring to FIG. 7, a switch module 601 comprises a first switching unit 603 and a second switching unit 605, each connected to a plurality of communication interfaces 607, 609, 611, 613, 615, 617, 619, 621. The switch module 601 includes a first set 623 of first and second switch interfaces 625, 627 and a second set 629 of first and second switch interfaces 631, 633. In this embodiment, the first and second set of switch interfaces 623, 629 share the data transfer requirements of the switching units, 603, 605. The first switch interface 625 of the first set 623 is coupled to the first switching unit 603 and handles the data transfer requirements of the first four communication interfaces 607, 609, 611, 613. The first switch interface 631 of the second set 629 is also coupled to the first switching unit 603 and is arranged to handle the data transfer requirements of the second set of four communication interfaces 615, 617, 619, 621. Similarly, the second switch interface 627 of the first set 623 is connected to the second switching unit 605, and is arranged to handle the data transfer requirements of the first set of four communication interfaces 607, 609, 611, 613. The second switch interface 633 of the second set 629 is also coupled to the second switching unit 605 and is arranged to handle the data transfer requirements of the second set of four communication interfaces 615, 617, 619, 621. In this embodiment, each switch interface has four local communication ports 635, 637, 639, 641, which enable each interface to be connected to four local communication paths W, X, Y, Z.

In one implementation, respective pairs of first, second, third and fourth communication ports 635, 637, 639, 641 of the first switch interfaces 625, 631 of the first and second sets may be connected to the same side of a respective communication path, indicated by +W, +X, +Y and +Z. For example, the first local communication port 635 of each of the first switch interfaces 625, 631 may be coupled to the same side of the communication path W, indicated as +W in FIG. 7, and the second local communication ports 637 of the first switch interfaces 625, 631 are coupled to the same side of the local communication path X, indicated as +X, as shown in FIG. 7. Similarly, respective pairs of first, second, third and fourth local communication ports 635, 637, 639, 641 of the second switch interfaces 627, 633 may also be coupled to the same side of a respective communication path, and which is the other side of the communication path to which each of the local communication ports of the first switch interfaces are connected, and are designated −W, −X, −Y and −Z. In this embodiment, one of the local communication ports 635 of each switch interface is used to interconnect the interfaces of the first set 623 to the interfaces of the second set 629. Thus, the local communication port 635 of the first switch interface 625 of the first set is connected to the local communication port 635 of the second switch interface 633 of the second set 629 by a communication link 643, thereby forming a first communication path W, and the local communication port 635 of the second switch interface 627 of the first set 623 is connected to the local communication port 635 of the first switch interface 631 by a communication link 645, thereby forming a second communication path W.

Figure 8:
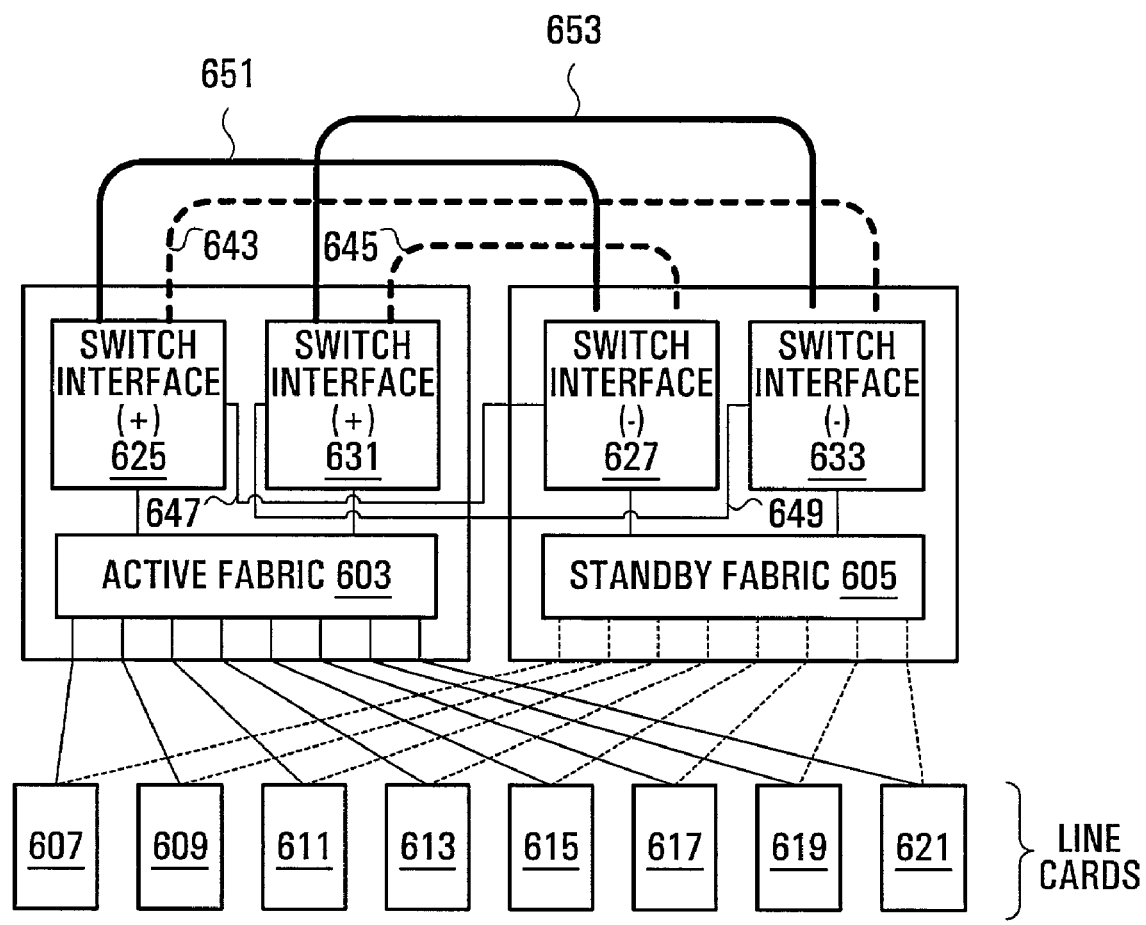
FIG. 8 shows a simplified design of the embodiment shown in FIG. 7.

A simplified diagram of the embodiment of FIG. 7 is shown in FIG. 8, and like parts are designated by the same reference numerals. A first passthrough interface 647 is provided to enable data to be transferred between the first and second switch interfaces 625, 627 of the first set, and a second passthrough interface 649 is provided to enable data to be transferred between the first and second switch interfaces of the second set. As shown in FIG. 7, the first switch interface 625 of the first set of switch interfaces is connected to the second switch interface 633 of the second set via a communication link 643, and the second switch interface 631 of the first set is connected to the first switch interface of the second set 627 via a communication link 645. Advantageously, these interconnections provide direct connectivity between the first switch interface of one set with the second switch interface of another set so that, together with the passthrough interfaces 647, 649, data can be transferred from one switch interface of one set and any of the switch interfaces of another set without needing to pass the data through either of the first or second switching units (or switching fabrics) 603, 605. For example, in the absence of the communication link 643, in order to pass data from the first switch interface 625 of the first set to the second switch interface 633 of the second set, one possible route would be to pass data from the first switch interface 625 of the first set to the first switch interface 631 of the second set through the first switching unit 603, and then to pass the data from the first switch interface to the second switch interface of the second set via the passthrough interface 649. However, the provision of a direct communication link 643 between the first switch interface 625 of the first set and the second switch interface 633 of the second set allows both the first switching unit 603 and the second passthrough interface 649 to be by-passed. Each of the other communication paths X, Y and Z connected between the first and second switch interfaces of a switch module may be implemented as two separate physical paths when the switch module contains two sets of first and second interfaces. For example, as shown in FIG. 8, the switch module 601 is connected in a Y dimensional communication loop, comprising a first communication link 651 connected between the first and second switch interfaces 625, 627 of the first set, and a second communication link 653 connected between the first and second switch interfaces 631, 633 of the second set. Again, the communication links 643, 645, which form a W-dimensional communication path allows data to be transferred between the first and second Y-dimensional paths 651, 653.

Figure 9:
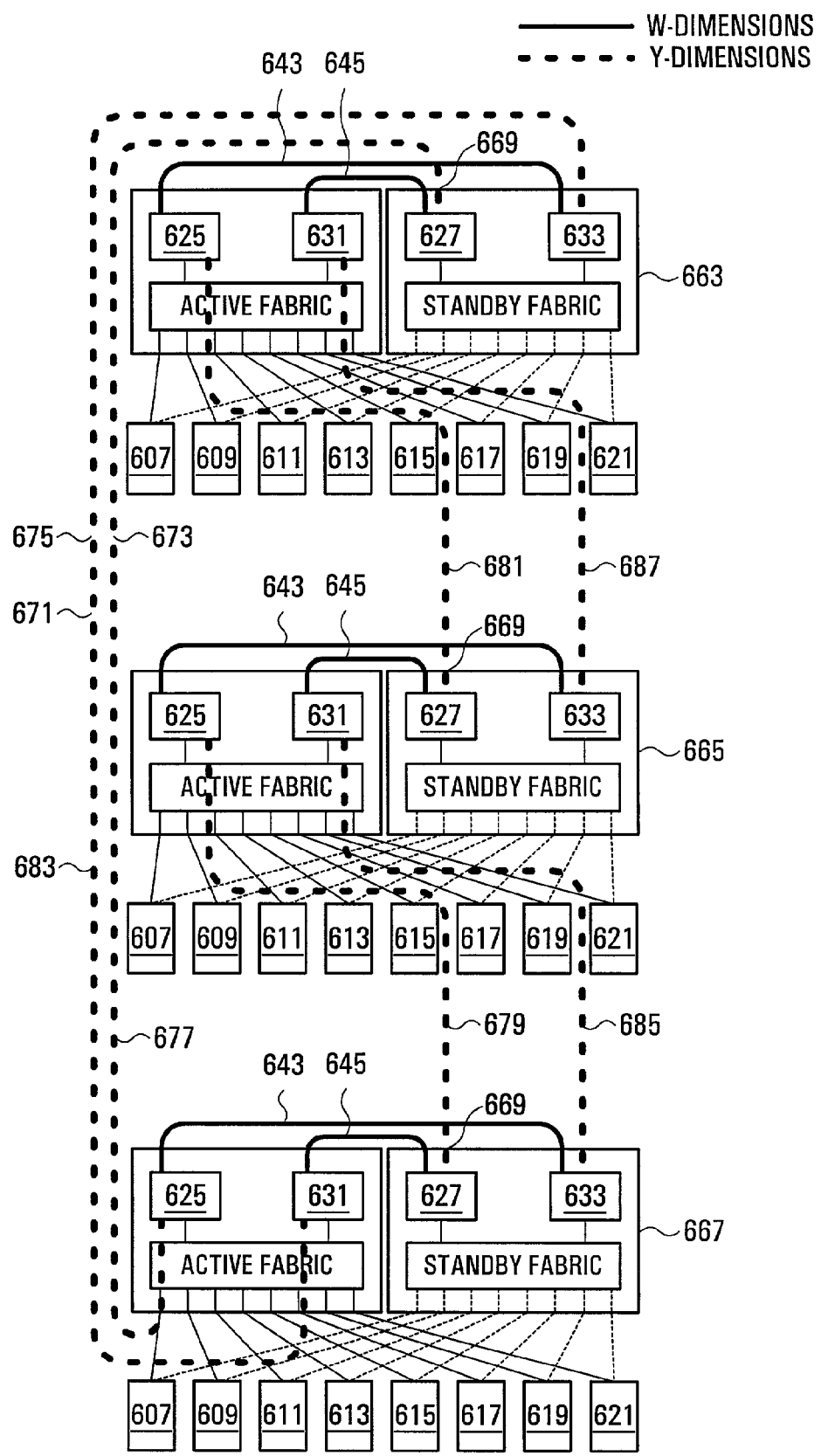
FIG. 9 shows a diagram of an array of interconnected switching modules of FIGS. 7 and 8 according to another embodiment of the present invention.

FIG. 9 shows a one-dimensional array of interconnected switch modules having first and second sets of switch interfaces. The one dimensional array 661 comprises first, second and third switch modules 663, 665, 667, each of which is similar to the switching module shown in FIG. 8, and like parts are designated by the same reference numerals. Each switch module has two sets of first and second switch interfaces, the first switch interface of each set being connected to the second switch interface of the other set via a Y-dimensional communication path 669 comprising communication links 643, 645, as for the embodiment shown in FIGS. 7 and 8. The switch modules are connected in a communication path loop or ring 671 shown by the dashed lines and designated as a Y-dimensional path. The communication path loop 671 comprises first and second physical paths 673, 675, one of which interconnects first sets of first and second switch interfaces of the switch modules and the other of which interconnects the second sets of first and second switch interfaces of the switch modules. Thus, the first path 673 includes a first communication link 677 which connects the second switch interface 627 of the first set of the first switch module 633 to the first switch interface 625 of the first set of the third switch module 667, a second communication link 679 connected between the second switch interface 637 of the first set of the third switch module 667 and the first switch interface 625 of the first set of the second switch modules 665, and a third communication link 681 connected between the second switch interface 627 of the first set of the second switch modules 665 and the first switch interface of the first set of the first switch module 663.

The second path 675 comprises a first communication link 683 connected between the second switch interface 633 of the second set of the first switch module 663 and the first switch interface 631 of the second set of the third switch module 667, a second communication link 685 connected between the second switch interface 633 of the second set of the third switch module 667 and the first switch interface 631 of the second set of the second switch module 665, and a third communication link 687 connected between the second switch interface of the second set of the second switch module 665 and the first switch interface 631 of the second set of the first switch module 663.

The or each switching unit in any one of the embodiments described above may comprise any suitable circuit, device or fabric to perform the required function and may comprise a single device or a plurality of devices.

Although the switch interface means may comprise two separate switch interfaces to enable one to be separated from the other, in another embodiment the switch interface may comprise a unitary device, or a plurality of devices that are not readily separable from each other.

The switch may be adapted to pass data cells or data packets to and from a communication network which may for example comprise an optical or wireline network.

The switch and any components thereof may be adapted to direct data on to the appropriate route through the switch according to labels associated with the data.

The switch may be adapted for either unidirectional or bi-directional communication or a combination of both, either with the communication network or with any of the local communication paths.

The passthrough interface in any of the embodiments described above may be implemented such that data arriving at one of the communication ports of one of the switch interfaces is transferred from the interface device connected to that communication port to the interface device of the other switch interface to which the corresponding communication port is connected, and that interface device may be adapted to transfer the data to another interface device of that other switch interface having a communication port to which the data is intended to be transferred.

Modifications and changes to the embodiments described herein will be apparent to those skilled in the art.

The invention claimed is:

1. A modular switch comprising:
    a plurality of primary switch interfaces, each primary switch-interface coupled to a first set of N>0 primary local links;
    a plurality of secondary switch interfaces, each secondary switch-interface coupled to a second set of N secondary local links, said secondary switch interfaces and said primary switch interfaces forming a plurality of switch-interface modules each said switch-interface module comprising one of said primary switch interfaces and one of said secondary switch interfaces; and
    a passthrough interface having N internal links interconnecting said one of said primary interfaces and said one of said secondary switch interfaces;
    wherein each of said N primary local links of each said primary switch interface connects to a secondary switch interface of a switch-interface module from among a first set of N switch-interface modules and each of said N secondary local links of each said secondary switch interface connects to a primary switch interface of a switch-interface module from among a second set of N switch-interface modules
    wherein each said switch-interface module is common to N arrays of switch-interface modules and the switch-interface modules within each of said N arrays form a ring.

2. The modular switch of claim 1 wherein each said primary switch interface switches data from any primary local link to any other primary local link within said first set of N switch-interface modules.

3. The modular switch of claim 1 wherein each said secondary switch interface switches data from any secondary local link to any other secondary local link within said second set of N switch-interface modules.

4. The modular switch of claim 1 wherein said passthrough interface connects any primary local link of a primary switch interface of any switch-interface module to any secondary local link of a secondary switch interface of said any switch-interface module.

5. The modular switch of claim 1 further comprising a primary switch unit coupled to said each primary switch-interface.

6. The modular switch of claim 5 wherein said each primary switch-interface connects said primary switch unit to any of said N>0 primary local links of said each primary switch-interface.

7. The modular switch of claim 6 further comprising a transfer interface interconnecting said one of said primary interfaces and said one of said secondary switch interfaces, said transfer interface enabling said primary switch unit to connect to any secondary local link of said one of said secondary switch interfaces.

8. The modular switch of claim 6 further comprising a secondary switch unit coupled to said each secondary switch-interface.

9. The modular switch of claim 8 wherein said transfer interface enables said secondary switch unit to connect to any primary local link of said one of said primary switch interfaces.

10. The modular switch of claim 8 wherein only one of said primary switch unit and said secondary switch unit is active during a specific time interval.

11. The modular switch of claim 10 further comprising at least one line card coupled to both said primary switch unit and said secondary switch unit.

12. The modular switch of claim 1 wherein each of said primary local links, said secondary local links, and said N internal links is a bidirectional link.

13. The modular switch of claim 1 wherein at least one of said primary local links, said secondary local links, and said internal links is a unidirectional link.

14. The modular switch of claim 1 wherein N=1 and each of said primary local links, said secondary local links, and said internal links is a bidirectional link so that said plurality of switch-interface modules forms a single bidirectional ring.

15. A modular switch comprising:
    a plurality of primary switch interfaces, each primary switch-interface coupled to a first set of N>0 primary local links:
    a plurality of secondary switch interfaces, each secondary switch-interface coupled to a second set of N secondary local links, said secondary switch interfaces and said primary switch interfaces forming a plurality of switch-interface modules each said switch-interface module comprising one of said primary switch interfaces and one of said secondary switch interfaces; and
    a passthrough interface having N internal links interconnecting said one of said primary interfaces and said one of said secondary switch interfaces;
    wherein each of said N primary local links of each said primary switch interface connects to a secondary switch interface of a switch-interface module from among a first set of N switch-interface modules and each of said N secondary local links of each said secondary switch interface connects to a primary switch interface of a switch-interface module from among a second set of N switch-interface modules
    wherein N=2 and said switch-interface modules are arranged into first-dimensional groups of switch-interface modules, and wherein second-dimensional groups each comprising one switch-interface from each said first-dimensional group are formed so that:
    switch-interface modules of each first-dimensional group form a first-dimensional ring traversing a first primary local link and a first secondary local link of each switch-interface module in said each first-dimensional group; and
    switch-interface modules of each second-dimensional group form a second-dimensional ring traversing a second primary local link and a second secondary local link of each switch-interface module in said each second-dimensional group.

* * * * *

UNITED STATES PATENT AND TRADEMARK OFFICE
CERTIFICATE OF CORRECTION

PATENT NO. : 7,170,895 B2  
APPLICATION NO. : 10/108515  
DATED : March 29, 2002  
INVENTOR(S) : B. Wirth et al.

It is certified that error appears in the above-identified patent and that said Letters Patent is hereby corrected as shown below:

Column 18, line 32, "interfaces:" is corrected to read as --interfaces;--.

Column 18, line 50, "modules" is corrected to read as --modules,--.

Signed and Sealed this

Twenty-second Day of July, 2008

JON W. DUDAS  
*Director of the United States Patent and Trademark Office*

UNITED STATES PATENT AND TRADEMARK OFFICE
CERTIFICATE OF CORRECTION

PATENT NO. : 7,170,895 B2
APPLICATION NO. : 10/108515
DATED : January 30, 2007
INVENTOR(S) : B. Wirth et al.

It is certified that error appears in the above-identified patent and that said Letters Patent is hereby corrected as shown below:

Column 18, line 32, "interfaces:" is corrected to read as --interfaces;--.

Column 18, line 50, "modules" is corrected to read as --modules,--.

This certificate supersedes the Certificate of Correction issued July 22, 2008.

Signed and Sealed this

Twelfth Day of August, 2008

JON W. DUDAS
*Director of the United States Patent and Trademark Office*